United States Patent
Chang

(10) Patent No.: US 7,872,862 B2
(45) Date of Patent: Jan. 18, 2011

(54) FIXING DEVICE

(75) Inventor: Yuan-Te Chang, Taipei (TW)

(73) Assignee: Asustek Computer Inc., Taipei (TW)

( * ) Notice: Subject to any disclaimer, the term of this patent is extended or adjusted under 35 U.S.C. 154(b) by 78 days.

(21) Appl. No.: 12/433,996

(22) Filed: May 1, 2009

(65) Prior Publication Data

US 2010/0020484 A1 Jan. 28, 2010

(30) Foreign Application Priority Data

Jul. 22, 2008 (TW) .............................. 97127838 A

(51) Int. Cl.
*G06F 1/16* (2006.01)
*A47B 81/00* (2006.01)
*A47F 7/00* (2006.01)
(52) U.S. Cl. ............................. 361/679.33; 361/679.37; 312/223.1; 312/223.2; 211/26
(58) Field of Classification Search ................................
361/679.01–679.45, 724–727, 679.55–679.59;
312/223.1, 223.2; 211/26
See application file for complete search history.

(56) References Cited

U.S. PATENT DOCUMENTS

| | | | | |
|---|---|---|---|---|
| 6,305,660 | B1 * | 10/2001 | Liao ........................... | 248/694 |
| 7,079,382 | B2 * | 7/2006 | Chen et al. ............. | 361/679.39 |
| 7,518,857 | B2 * | 4/2009 | Chen et al. ............. | 361/679.33 |
| 7,755,886 | B2 * | 7/2010 | Peng et al. ............. | 361/679.33 |
| 2004/0075978 | A1 | 4/2004 | Chen et al. | |
| 2004/0252452 | A1 * | 12/2004 | Chen ........................... | 361/685 |
| 2005/0052841 | A1 * | 3/2005 | Chen et al. ................ | 361/685 |
| 2005/0068721 | A1 * | 3/2005 | Chen et al. ................ | 361/685 |
| 2005/0094369 | A1 * | 5/2005 | Chen et al. ................ | 361/685 |
| 2005/0280982 | A1 * | 12/2005 | Yang ........................... | 361/684 |

FOREIGN PATENT DOCUMENTS

CN  2505890  8/2002

OTHER PUBLICATIONS

English language translation of abstract of CN 2505890.

* cited by examiner

*Primary Examiner*—Jayprakash N Gandhi
*Assistant Examiner*—Nidhi Desai
(74) *Attorney, Agent, or Firm*—Thomas, Kayden, Horstemeyer & Risley, LLP

(57) ABSTRACT

A fixing device for detachably fastening an electronic element inside thereof is described. Two fastening modules are respectively disposed on the two opposite inner walls of a housing. A positioning disk is rotatably connected with the positioning frame and has a concave section with a pair of inner side surfaces. The positioning disk is disposed between the first pair of positioning surfaces while the positioning disk is disposed between the second pair of positioning surfaces. When the positioning disk is at a first position, the pair of inner side surfaces is aligned with the first pair of positioning surfaces to allow the electronic element to be inserted between. When the positioning disk is rotated from the first position to the second position, the pair of inner side surfaces is aligned with the second pair of positioning surfaces, and the first and second connection members engage each other to fasten the electronic element.

10 Claims, 8 Drawing Sheets

FIXING DEVICE

RELATED APPLICATIONS

This application claims priority to Taiwan Application Serial Number 97127838, filed Jul. 22, 2008, which are herein incorporated by reference.

BACKGROUND

1. Field of Invention

The present invention relates to a fixing device. More particularly, the present invention relates to a fixing device with a detachable electronic element.

2. Description of Related Art

A hard disk drive, floppy disk drive or optical disk drive is conventionally secured to a fixing device of a desktop computer by using a screw to fasten those removable units. However, it is somewhat inconvenient for users to use extra tools, e.g. a screwdriver and screws, to fasten or remove those removable units. For the forgoing reasons, there is a need for a convenient way to fasten or remove those removable units within the fixing device.

SUMMARY

It is therefore an objective of the present invention to provide a fixing device with a detachable electronic element for a user to manually secure or remove the detachable electronic element.

In accordance with the foregoing and other objectives of the present invention, a fixing device for detachably fastening an electronic element inside includes the following components. The electronic element has a first connection member. The housing has two opposite inner walls. Two fastening modules are respectively disposed on the two opposite inner walls. Each fastening module includes the following components. A positioning frame includes a first pair of positioning surfaces and a second pair of positioning surfaces. A positioning disk is rotatably connected with the positioning frame and has a concave section with a pair of inner side surfaces. When the positioning disk is rotatably connected with the positioning frame, the positioning disk is disposed between the first pair of positioning surfaces, the positioning disk is disposed between the second pair of positioning surfaces, and either one of the second pair of positioning surfaces having a second connection member. The positioning disk is rotated relative to the positioning frame to be selectively at a first position or a second position. When the positioning disk is at a first position, the pair of inner side surfaces is aligned with the first pair of positioning surfaces to form a pair of continuous surfaces allowing the electronic element to be inserted between. When the positioning disk is rotated from the first position to the second position, the pair of inner side surfaces is aligned with the second pair of positioning surfaces, the first and second connection members engage each other to fasten the electronic element.

Thus, the present invention provides a fixing device equipped with a fastening module to enable a user to secure an electronic element inside thereof or remove the electronic element from thereof without using extra tools or fasteners.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
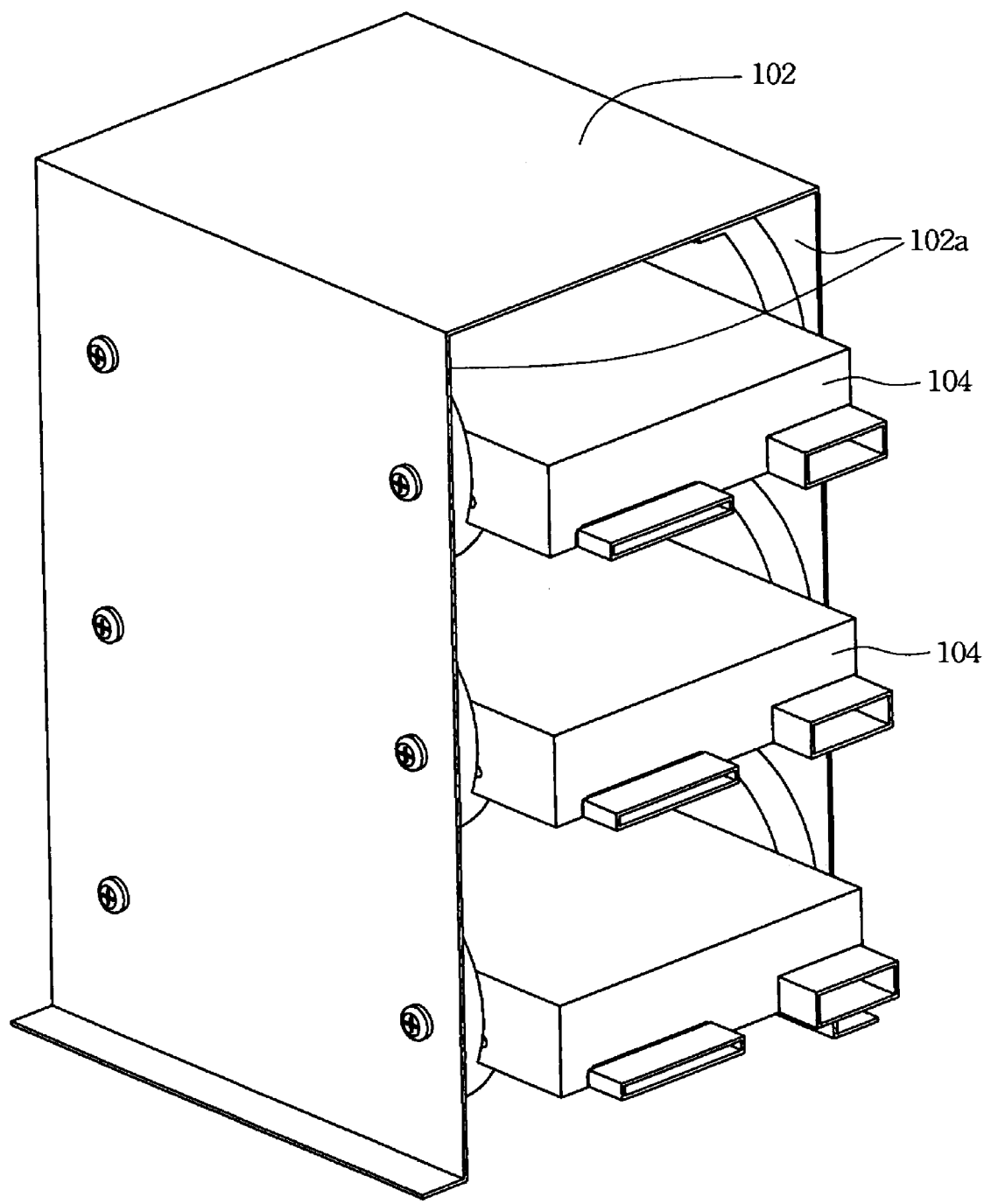
FIG. 1 illustrates a fixing device according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
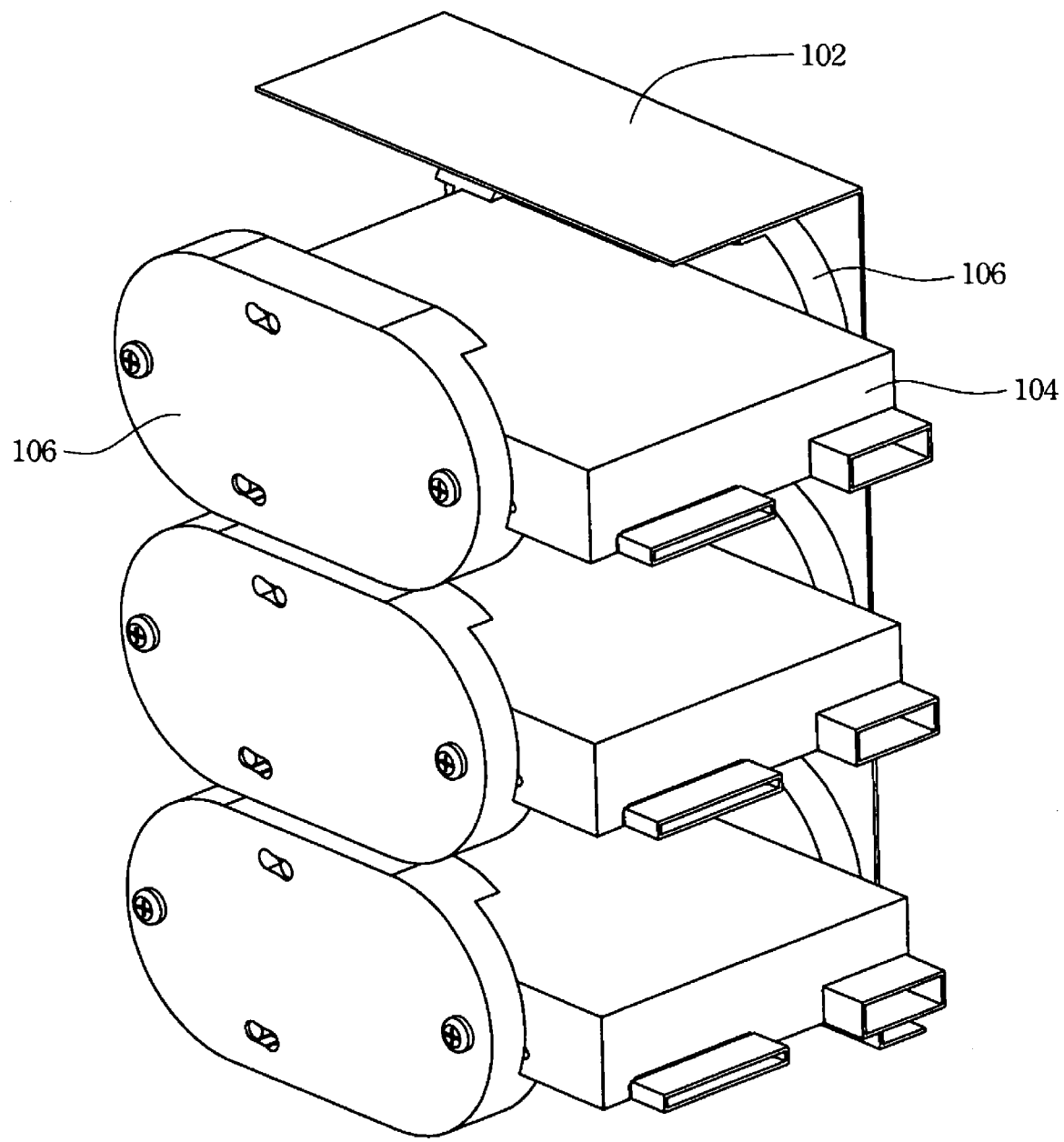
FIG. 2 illustrates the fixing device as illustrated in FIG. 1 with half of the housing removed.

FIG. 1 illustrates a fixing device according to one preferred embodiment of this invention. FIG. 2 illustrates the fixing device as illustrated in FIG. 1 with half of the housing removed. The fixing device 100 includes a housing 102 and two fastening modules 106. Two fastening modules 106 are respectively secured on two opposite inner walls 102a of the housing 102 for an electronic element 104 to be inserted or removed. The fixing device 100 can be an outer case of a desktop computer or an optical disc writer. The electronic element 104 can be a hard disk drive, floppy disk drive or optical disk drive.

Figure 3A:
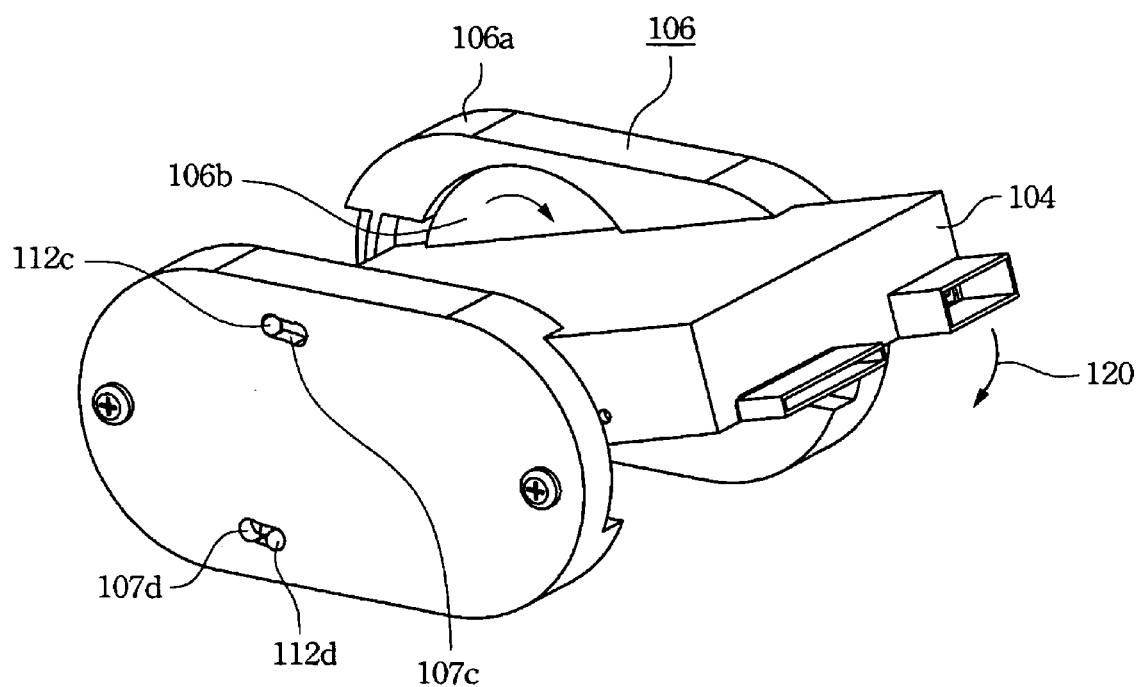
FIG. 3A illustrates an electronic element positioned between two fastening modules but not yet secured according to one preferred embodiment of this invention.
Figure 3B:
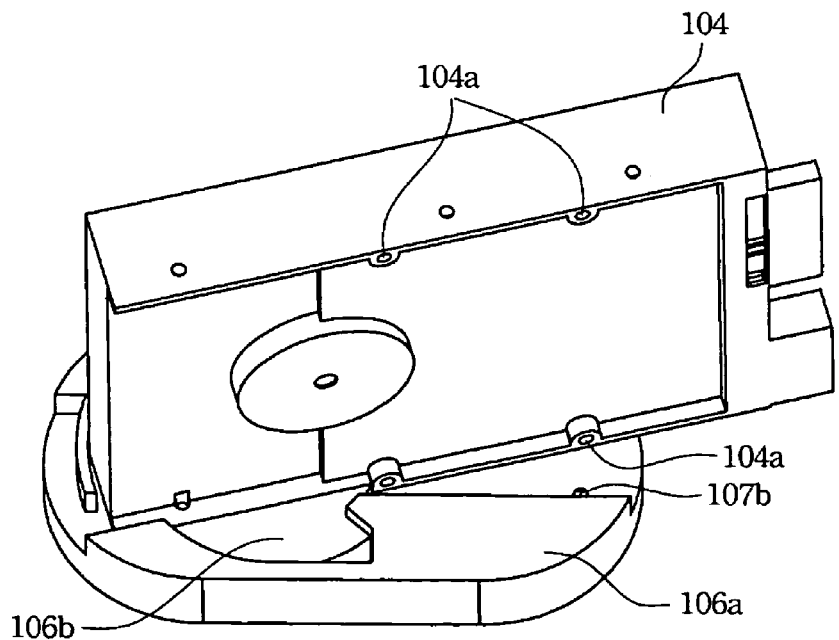
FIG. 3B illustrates a different view of the electronic element in FIG. 3A.

FIG. 3A illustrates an electronic element positioned between two fastening modules but not yet secured according to one preferred embodiment of this invention. FIG. 3B illustrates a different view of the electronic element in FIG. 3A. Each fastening module 106 includes a positioning frame 106a and a positioning disc 106b. When two fastening modules 106 are respectively secured on two opposite inner walls 102a of the housing 102 (as illustrated in FIG. 1), an electronic element 104 can be slantingly inserted and then sandwiched between two fastening modules 106 (as illustrated in FIG. 3A). In this case, the electronic element 104 is not yet secured within the fastening module 106.

Figure 4:
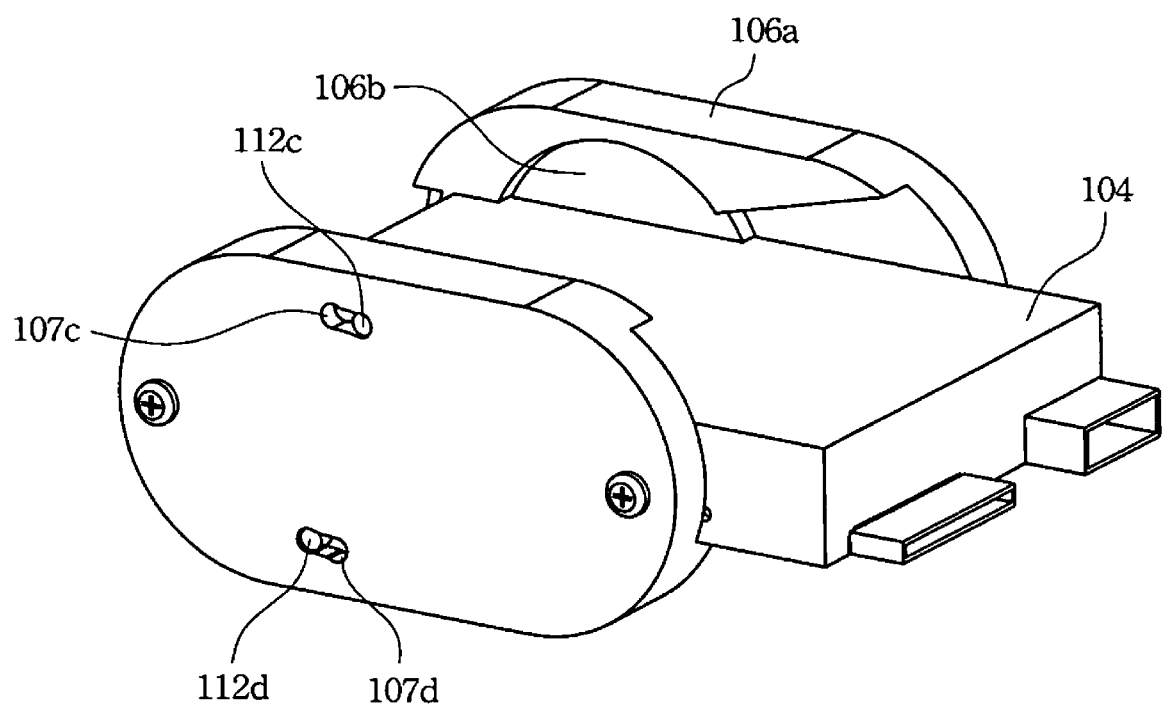
FIG. 4 illustrates an electronic element positioned and secured between two fastening modules according to one preferred embodiment of this invention.

When the electronic element 104 is rotated from an inclined status (as illustrated in FIG. 3A) along a direction 120 to a horizontal status (as illustrated in FIG. 4), a connection member (e.g. a positioning hole 104a) of the electronic element 104 engage a connection member (e.g. a positioning pin 107b) of the positioning frame 106a, thereby securing the electronic element 104 within the fastening module 106.

Figure 5:
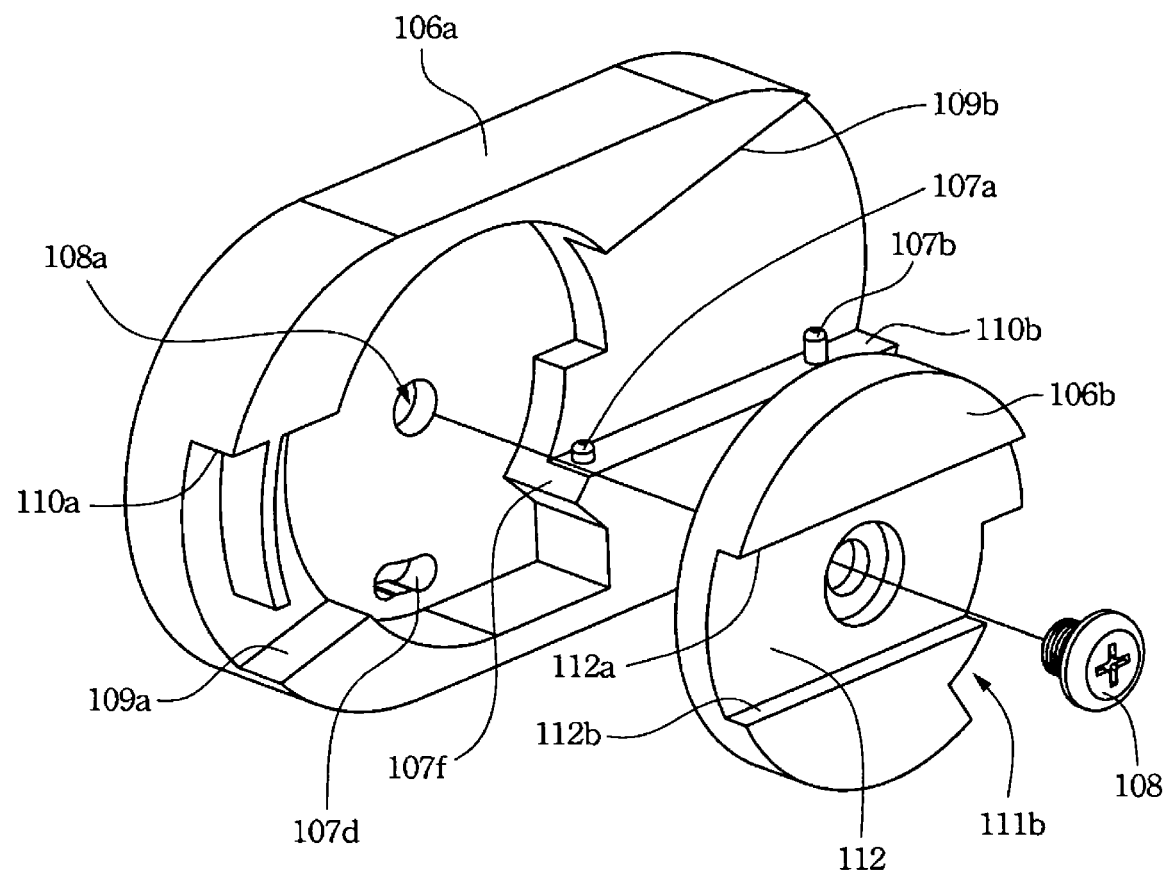
FIG. 5 illustrates an exploded view of the fixing device according to one preferred embodiment of this invention.

FIG. 5 illustrates an exploded view of the fixing device according to one preferred embodiment of this invention. The positioning disk 106b is rotatably connected with the positioning frame 106a by inserting a screw 108 via a through hole 108a to achieve. The positioning disk 106b has a concave section 112, which includes a pair of parallel inner side surfaces for sandwiching a top surface and a bottom surface of the electronic element 104 (as illustrated in FIG. 3A and FIG. 3B). The positioning frame 106a includes a first pair of parallel positioning surfaces (109a, 109b) between which the positioning disk 106b is located. The positioning frame 106a further includes a second pair of parallel positioning surfaces (110a, 110b) between which the positioning disk 106b is located. Positioning surfaces (109a, 110a) are located at one side of the positioning disk 106b while positioning surfaces (109b, 110b) are located at the other side of the positioning disk 106b. In an embodiment, the second connection member, i.e. positioning sticks (107a, 107b), can be located on the positioning surface 110b (as illustrated in FIG. 5). In an alternate embodiment (not illustrated in drawings), the second connection member can be located on the positioning surface 110a or located both on the positioning surfaces (110a, 110b).

Figure 6:
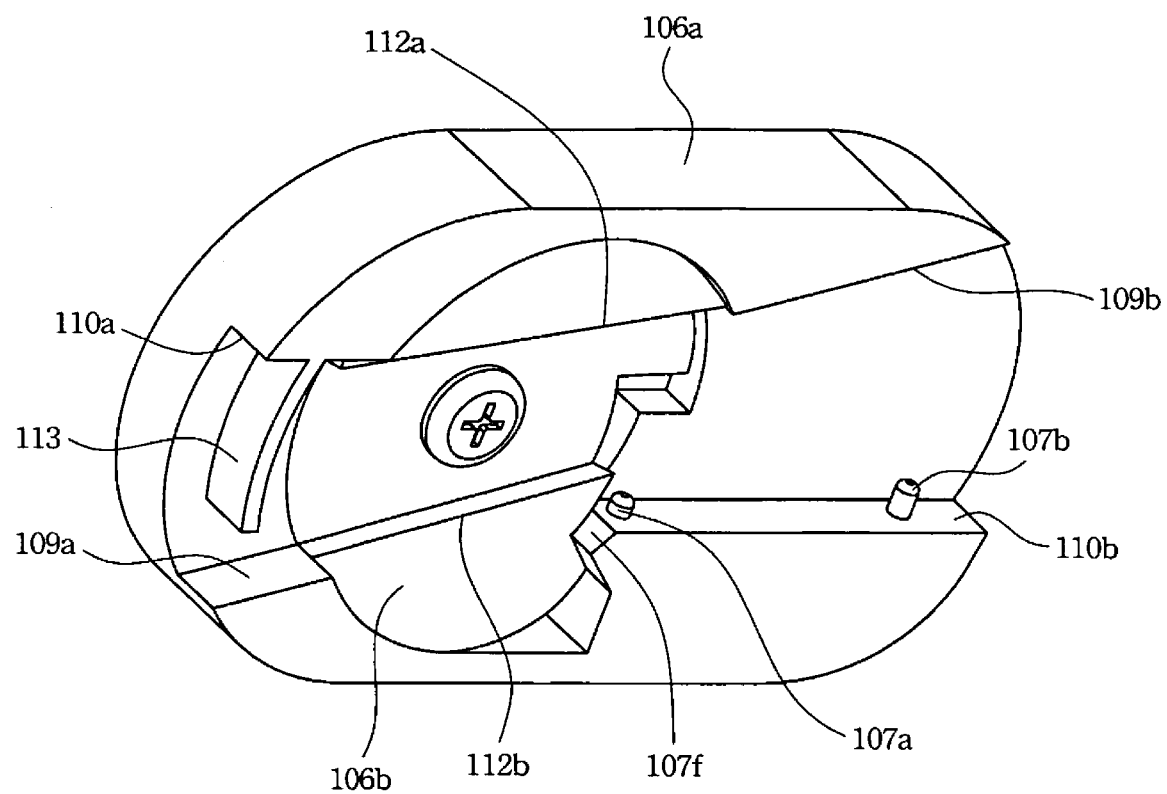
FIG. 6 illustrates one of the two fastening modules as illustrated in FIG. 3A.

FIG. 6 illustrates one of the two fastening modules as illustrated in FIG. 3A. In FIG. 3, the positioning disk 106b is located at a first position relative to the positioning frame 106a. The side surface 112a is aligned with the positioning surface 109b to form a continuous surface while the side surface 112b is aligned with the positioning surface 109a to form a continuous surface. Therefore, the electronic element 104 can be slantingly inserted into the fastening module 106 (as illustrated in FIG. 3A). In this embodiment, a positioning stick 107a is shorter than a positioning stick 107b, which is located farther from positioning disk 106b than the positioning stick 107a is, in order to prevent the positioning sticks (107a, 107b) from interfering inserting of the electronic element 104. In particular, when the positioning disk 106b is located at the first position and the positioning stick 107a does not intersect a virtual extensional surface (not illustrated in drawings) of the side surface 112b, the electronic element 104 can be slantingly inserted into the fastening module 106 properly.

In addition, a block wall 113 of the positioning frame guides the electronic element 104 to be properly secured. When the electronic element 104 is inserted until being in contact with the block wall 113 and the electronic element 104 is rotated from the inclined status (as illustrated in FIG. 3A) along the direction 120 to the horizontal status (as illustrated in FIG. 4), the block wall 113 guides the connection member of the electronic element 104 to engage the connection member of the positioning frame 106a to properly secure the electronic element 104 within the fastening module 106.

Figure 7:
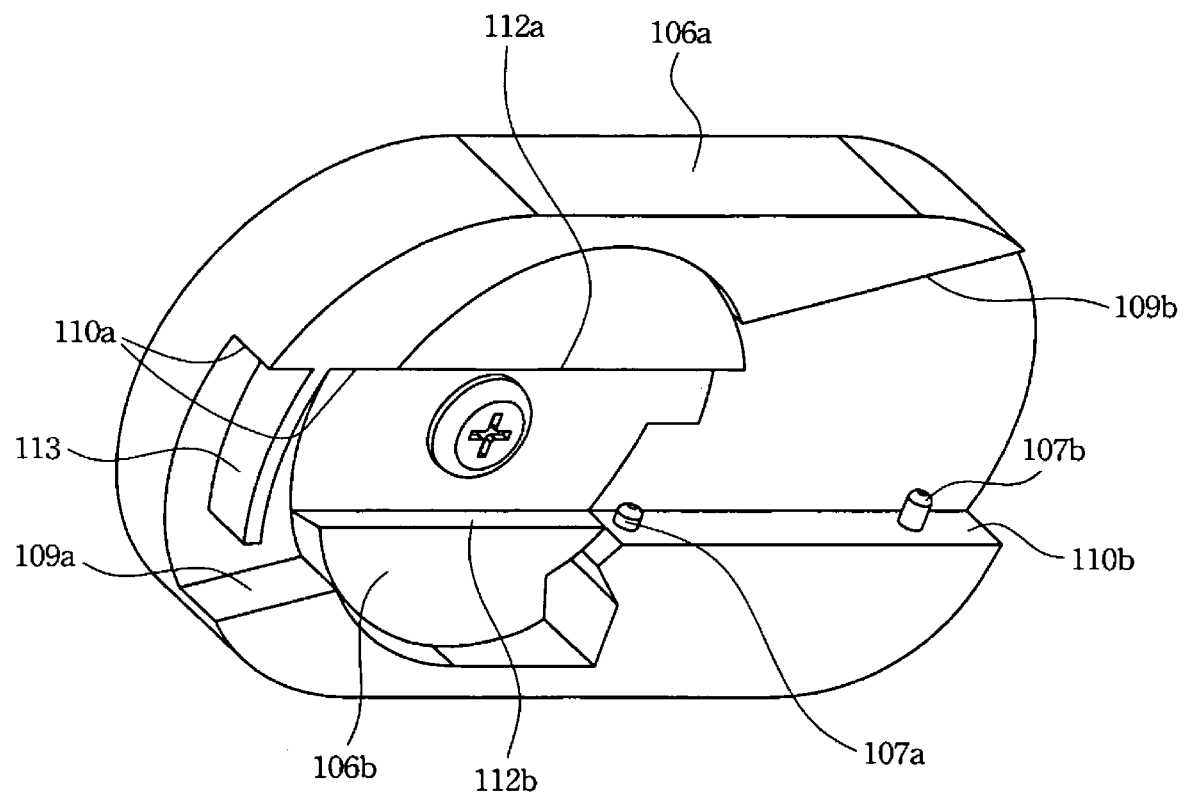
FIG. 7 illustrates one of the two fastening modules as illustrated in FIG. 4.

FIG. 7 illustrates one of the two fastening modules as illustrated in FIG. 4. When users tend to secure the electronic element 104 within the fastening module 106, the positioning disk 106b is rotated from a first position (as illustrated in FIG. 6) to a second position (as illustrated in FIG. 7) relative to the positioning frame 106a. The side surface 112a is aligned with the positioning surface 110a while the side surface 112b is aligned with the positioning surface 110b. Thus, the connection member, on a bottom surface of the electronic element 104, engages the connection member of the positioning frame 106a to properly secure the electronic element 104 within the fastening module 106.

Referring to FIGS. 5-7, how the positioning disk 106b being controlled is described below. The positioning frame 106a has a convex member 107f to interfere a concave section 111b so as to restrict a rotation range of the positioning disk 106b. In particular, when the convex member 107f hits two opposite inner sidewalls of the concave section 111b, the positioning disk 106b cannot be further rotated.

Figure 8:
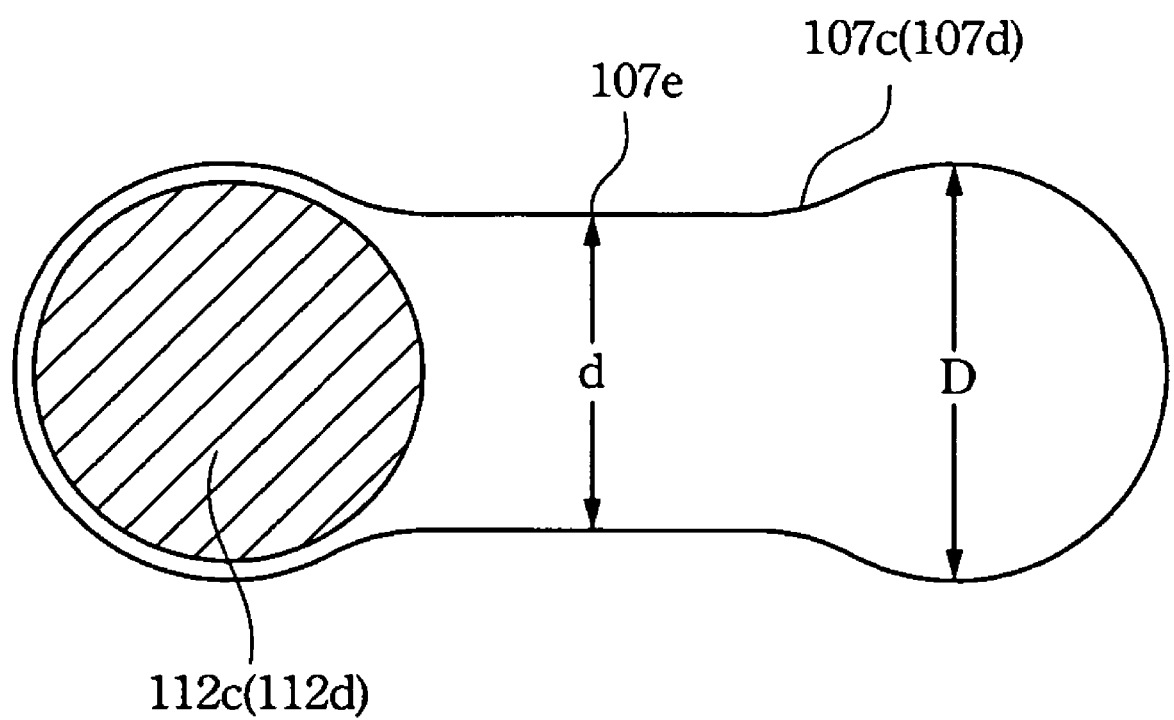
FIG. 8 illustrates an enlarged view of a positioning slot and a position pin as illustrated in FIG. 3A and FIG. 4.

Referring to FIGS. 3A, 4, 8, how the positioning disk 106b being controlled is described further. When the positioning disk 106b is rotated from the first position (as illustrated in FIG. 6) to the second position (as illustrated in FIG. 7) relative to the positioning frame 106a, the positioning disk 106b needs to be temporarily secured to allow the electronic element 104 to be properly inserted into or reliably secured within the fastening module 106. The positioning disk 106b has two positioning pins (112c, 112d) respectively interacted with positioning slots (107c, 107d). The positioning pins (112c, 112d) and the concave section 112 (as illustrated in FIG. 5) are respectively located on two opposite sides of the positioning disk 106b. The positioning pins (112c, 112d) are located on a first side of the positioning disk, which faces the inner wall 102a of the housing 102 (as illustrated in FIG. 1) while the concave section 112 is located on a second side of the positioning disk 106b, which faces the electronic element 104. Referring to FIG. 8, each positioning slot (107c, 107d) has two opposite ends of circular hole and a middle section. The middle section has a smaller inner radius (d) than an inner radius (D) of the two circular holes. Therefore, the positioning pins (112c, 112d) can be temporarily secured within the circular holes of the positioning slots (107c, 107d). When the positioning pin (112c, 112d) engages within one of the circular holes, the positioning disk 106b is at the first position or the second position.

According to discussed embodiments, the present invention provides a fixing device equipped with a fastening module to enable a user to secure an electronic element inside thereof or remove the electronic element from thereof without using extra tools or fasteners.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A fixing device for detachably fastening an electronic element inside, the electronic element having a first connection member, the fixing device comprising:
   a housing having two opposite inner walls; and
   two fastening module respectively disposed on the two opposite inner walls, each fastening module comprising:
   a positioning frame comprising a first pair of positioning surfaces and a second pair of positioning surfaces; and
   a positioning disk being rotatably connected with the positioning frame and having a concave section with a pair of inner side surfaces;
   when the positioning disk is rotatably connected with the positioning frame, the positioning disk is disposed between the first pair of positioning surfaces, the positioning disk is disposed between the second pair of positioning surfaces, and either one of the second pair of positioning surfaces having a second connection member,
   wherein the positioning disk is rotated relative to the positioning frame to be selectively at a first position or a second position,
   when the positioning disk is at a first position, the pair of inner side surfaces is aligned with the first pair of positioning surfaces to form a pair of continuous surfaces allowing the electronic element to be inserted between, when the positioning disk is rotated from the first position to the second position, the pair of inner side surfaces is aligned with the second pair of positioning surfaces, and the first and second connection members engage each other to fasten the electronic element.

2. The fixing device of claim 1, wherein the electronic element is a hard disk drive, floppy disk drive or optical disk drive.

3. The fixing device of claim 1, wherein the positioning frame is an oval-shaped member.

4. The fixing device of claim 1, wherein the positioning disk is a circular disk, and the pair of inner side surfaces are in parallel with each other.

5. The fixing device of claim 4, wherein the first pair of positioning surfaces are in parallel with each other.

6. The fixing device of claim 5, wherein the second pair of positioning surfaces are in parallel with each other.

7. The fixing device of claim 1, wherein the first connection member is a positioning hole and the second connection member is a positioning stick.

8. The fixing device of claim 1, wherein the positioning disk has a positioning pin located on a first side of the positioning disk, which faces the inner wall of the housing, the concave section is located on a second side of the positioning disk, which faces the electronic element.

9. The fixing device of claim 8, wherein the positioning frame has a positioning slot to interact with the positioning pin, the positioning slot has two opposite ends of circular holes and a middle section, the middle section has a smaller inner radius than an inner radius of the circular hole.

10. The fixing device of claim 9, wherein the positioning disk is at the first position or the second position when the positioning pin engages within one of the circular holes.

* * * * *